Feb. 15, 1927.

W. F. GROENE 1,617,902

LATHE

Filed Sept. 15, 1924

Inventor
WILLIAM F. GROENE,
By Murray & Gugelter
Attorneys

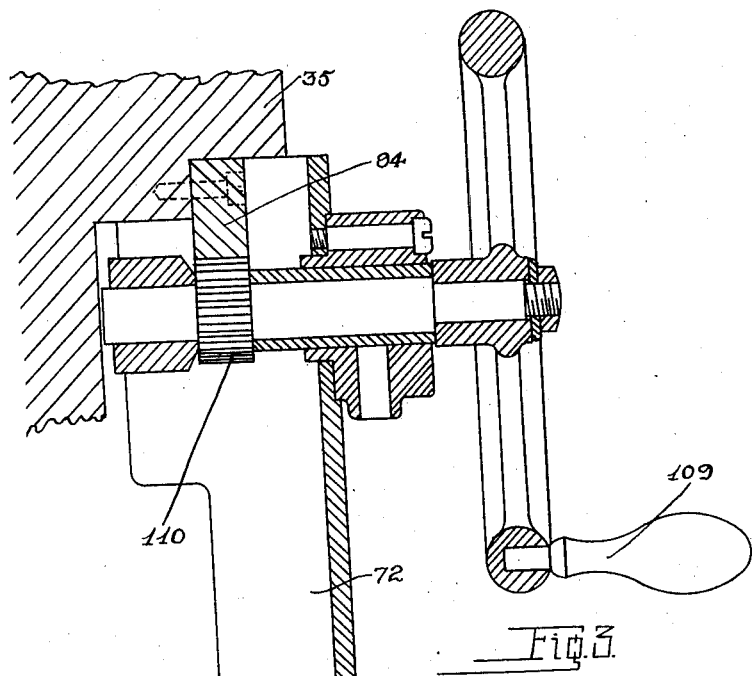
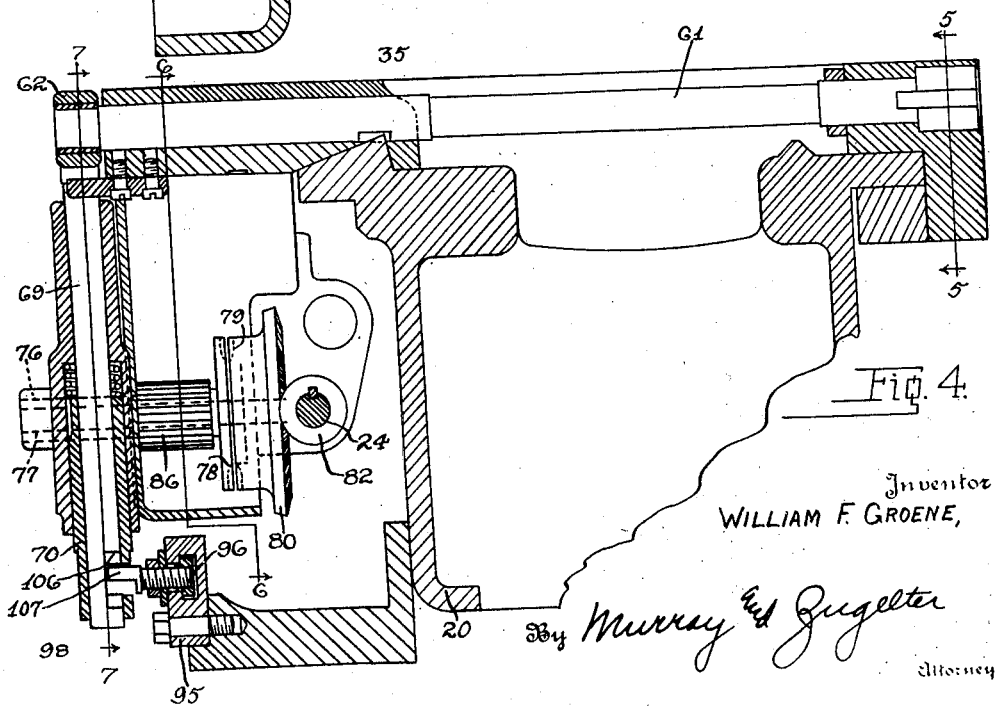

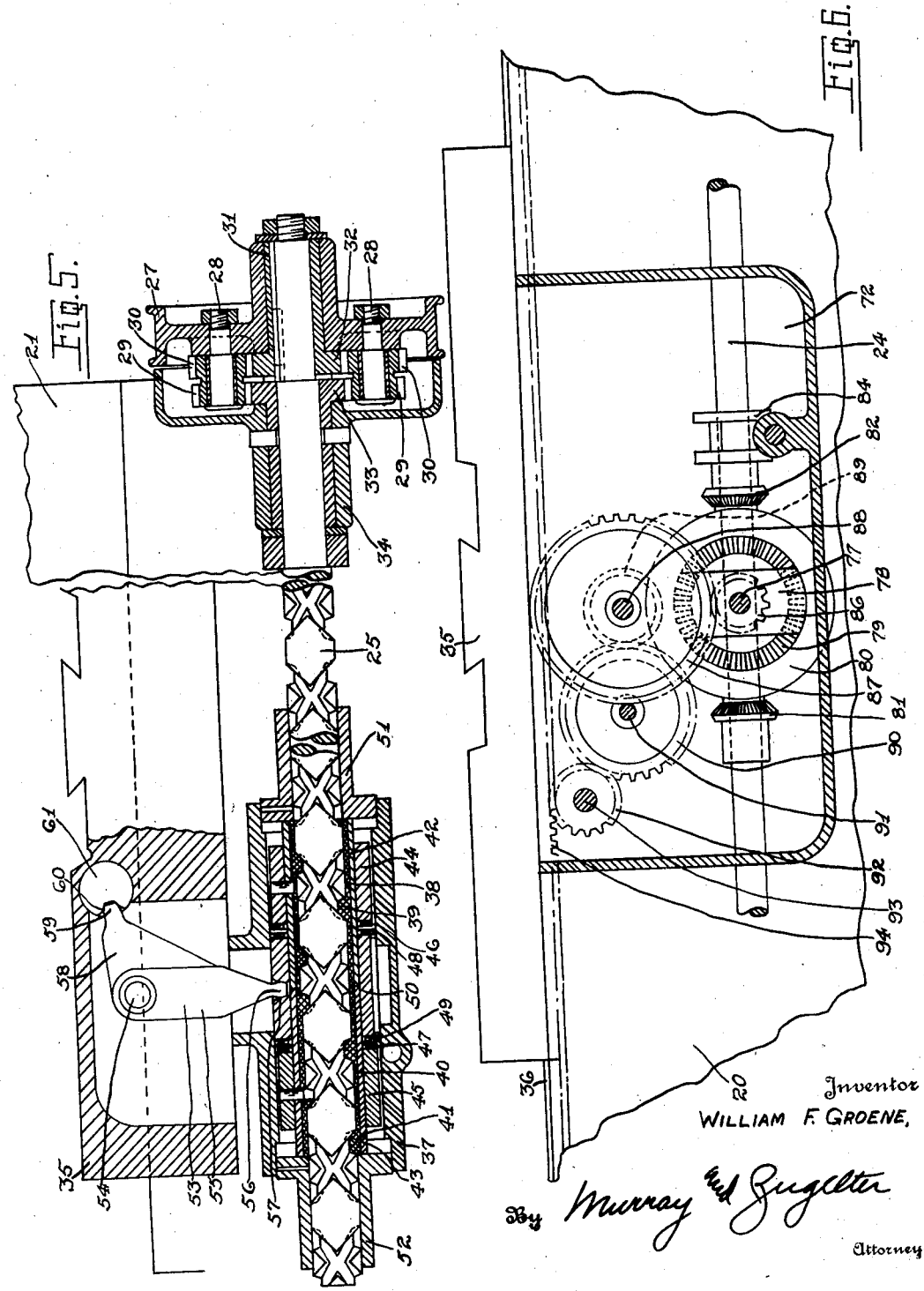

Feb. 15, 1927.  W. F. GROENE  1,617,902
LATHE
Filed Sept. 15, 1924  4 Sheets-Sheet 4
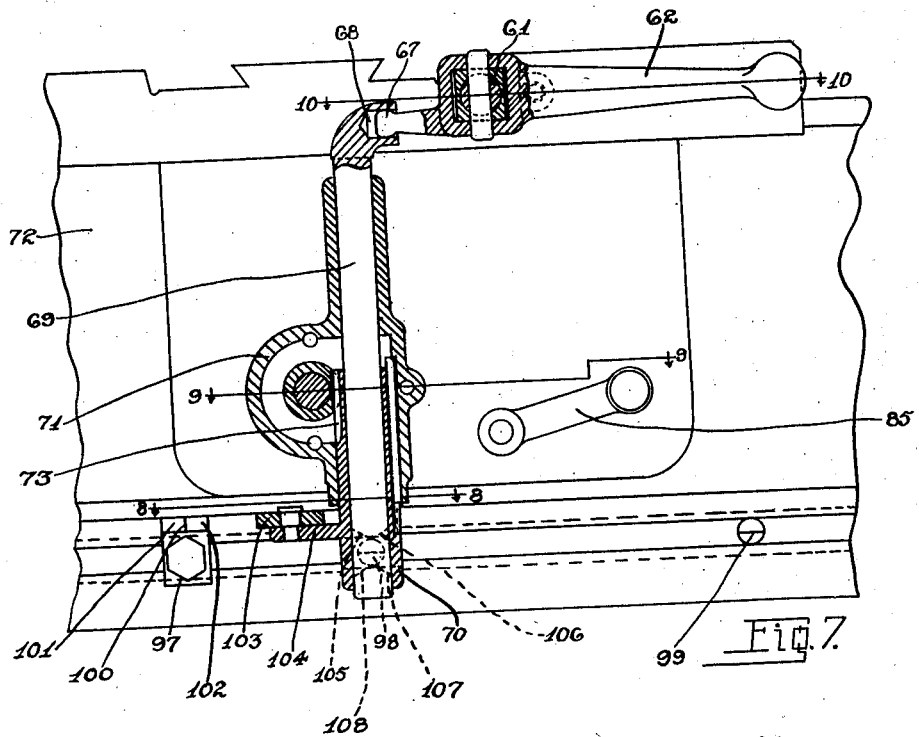
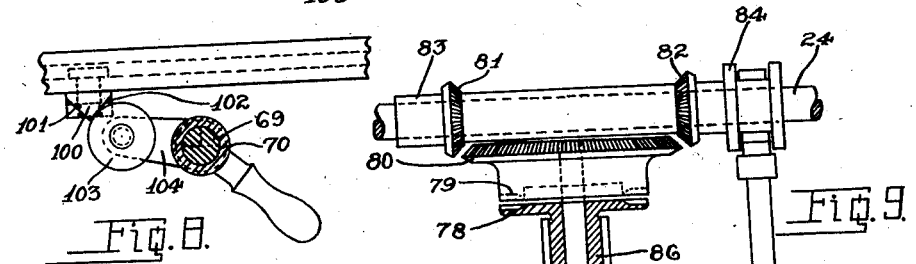
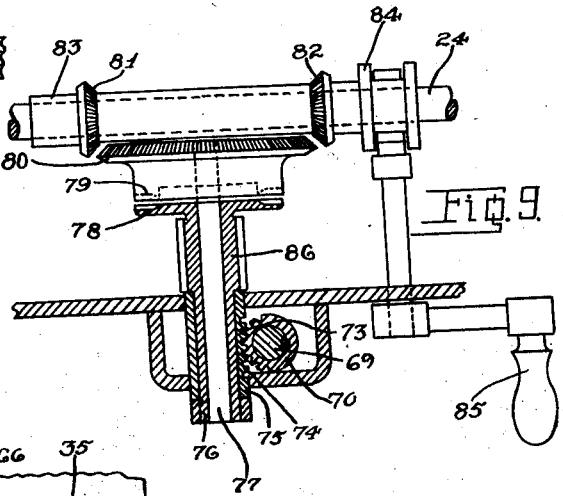
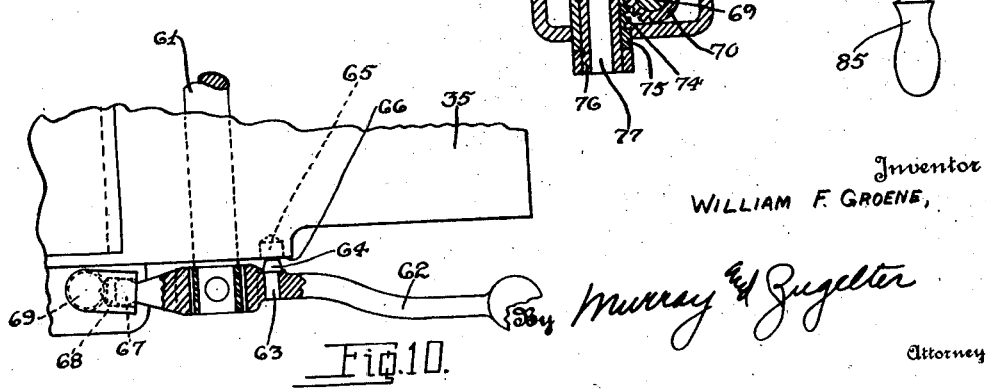
Inventor
WILLIAM F. GROENE,
By Murray & Bugelter
Attorneys Patented Feb. 15, 1927.

1,617,902

UNITED STATES PATENT OFFICE.

WILLIAM F. GROENE, OF CINCINNATI, OHIO, ASSIGNOR TO THE R. K. LEBLOND MACHINE TOOL COMPANY, OF CINCINNATI, OHIO, A CORPORATION OF DELAWARE.

LATHE.

Application filed September 15, 1924. Serial No. 737,702.

An object of my invention is to provide a lathe with means for effecting a rapid power actuated traverse of the tool carriage, and wherein means are provided for precluding the normal longitudinal cutting feed of the tool carriage when the traverse means is operative and vice versa.

Another object of my invention is to provide a machine of the class described wherein a single lever may be utilized for controlling both the normal carriage feeding means and the rapid traverse power actuated feeding means.

Another object of my invention is to provide a simple and efficient device for the purposes stated.

These and other objects are attained by the means described herein and disclosed in the accompanying drawings, in which:

Fig. 3 is an enlarged sectional view on line 3—3 of Fig. 1.

Fig. 4 is an enlarged sectional view on line 4—4 of Fig. 1.

Fig. 5 is an enlarged sectional view on line 5—5 of Fig. 4.

Fig. 6 is a sectional view on line 6—6 of Fig. 4.

Fig. 7 is a sectional view on line 7—7 of Fig. 4.

Fig. 8 is a sectional view on line 8—8 of Fig. 7.

Fig. 9 is a sectional view on line 9—9 of Fig. 7.

Fig. 10 is a sectional view on line 10—10 of Fig. 7.

Figure 1:
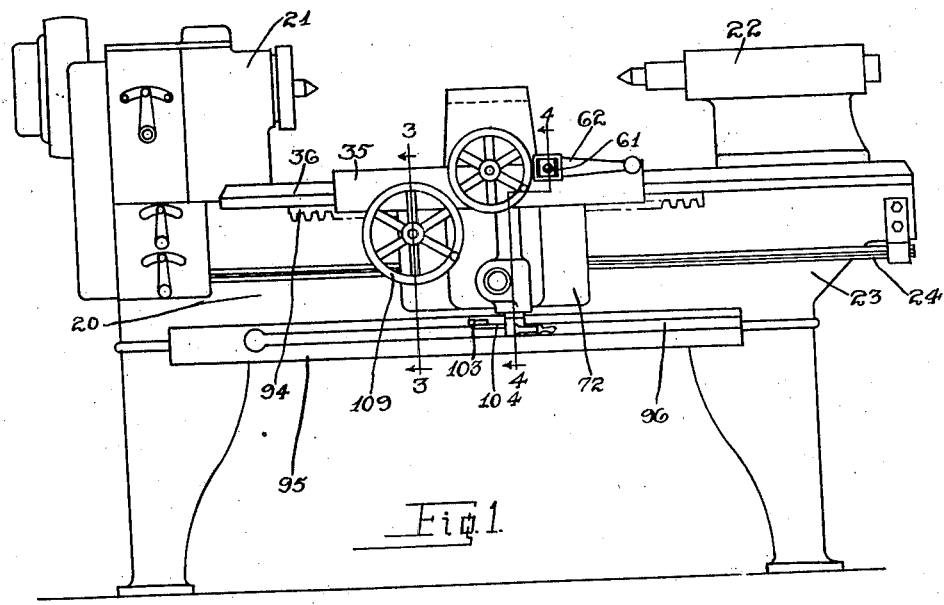
Fig. 1 is a front elevation of a lathe embodying my invention.
Figure 2:
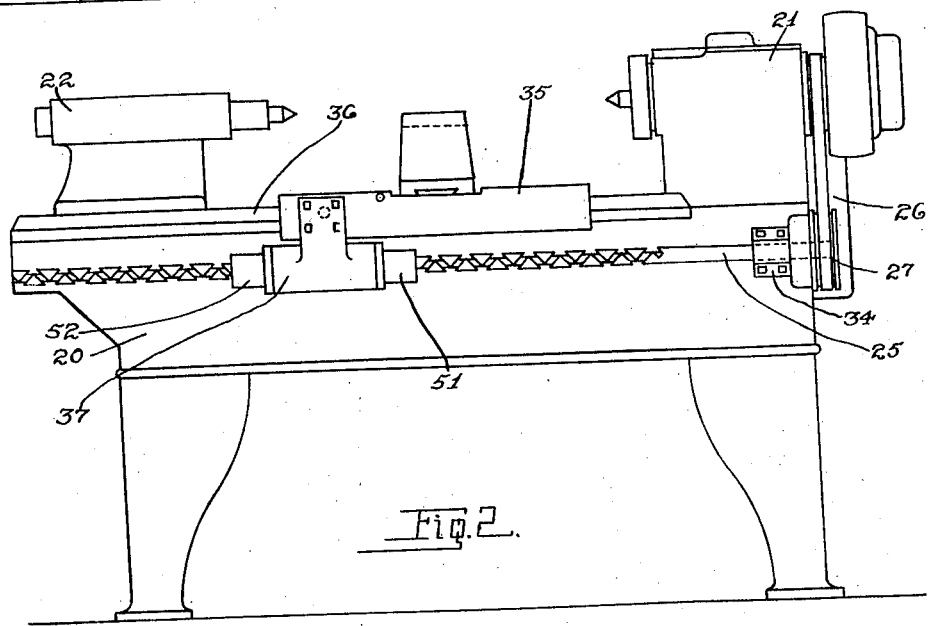
Fig. 2 is a rear elevation of a lathe shown in Fig. 1.

The lathe bed 20 is provided with the usual head stock 21 and tail stock 22 and has along its forward face 23 a feed shaft 24 that may be driven through any suitable gearing or similar driving means disposed within or associated with the head stock 21. At the rear of the lathe there is provided a feed screw 25 driven from the head stock 21 in any suitable manner, for example by means of a belt 26 and pulley 27 mounted on the screw 25. The feed screw 25 is provided with right and left hand threads. Any suitable means may be employed for transmitting motion or power from the pulley 27 to the shaft 25, for example as shown in Fig. 5 the pulley carries stud bearings 28 on which are revolubly mounted twin spur gears 29 and 30. The pulley is revolubly mounted upon a sleeve 31 keyed to the feed screw 25. The sleeve 31 has formed on its inner edge a spur gear 32 that engages the gear 30. A second sleeve 33 is pinned to the bracket or housing 34 mounted on the lathe bed and revolubly supports the feed screw 25. From the foregoing it will be evident that as the pulley 27 is revolved, motion will be transmitted to the feed screw 25.

A carriage 35 is reciprocally mounted upon ways 36 formed on the upper face of the lathe bed. The rear portion of the carriage 35 carries a cylindrical depending housing 37 within which is provided clutching means for selectively bringing the right and left hand threads of the feed screw 25 into operation for actuating the carriage 35. The said means comprise a bearing 38 provided with threads 39 disposed within the left hand thread formed in the feed screw and a similar bearing 40 provided with male threads or lugs 41 engaging the right hand thread of the feed screw. About each bearing is disposed a bushing 42, and 43. The bushing 42 is pinned to the bearing 38 and to the clutch member 44. The bushing 43 is pinned to the bearing 40 and a clutch member 45. Each of the clutch members 44 and 45 is provided with a clutching face 46 and 47 respectively, disposed adjacent its complementary clutching face 48 and 49 formed on the reciprocating clutch member 50 revolubly mounted upon and about the adjacent ends of the bushings and bearings. From the foregoing it will be readily evident that the clutch member 50 may be actuated for selective engagement with either of the clutch members 44 and 45 whereby to lock such selective clutch member against rotation with the feed screw and the bearing and bushing associated with such selected member, whereupon the power of the feed screw is converted into movement of the clutch member 50 and the housing 37 longitudinally of the feed screw. The carriage 35 is therefore longitudinally actuated upon the ways 36 by means of the feed screw 25. The housing 37 is provided with cylindrical bearings 51 and 52 extending from opposite sides thereof for supporting the feed screw 25. The means for actuating the clutch member 50 comprises a pivotally mounted bell crank lever 53 having a pivotal mounting 54 upon the carriage 35, the one arm 55 of said bell crank lever being provided with a globular head 56 for pivotal engagement in a suitable socket or recess 57 provided in the clutch member 50. The arm 58 of the bell crank lever is provided with a globular head 59 that is lodged in a socket or recess 60 provided in the shaft 61 extending transversely of the carriage 35.

The shaft 61 extends to the front of the carriage and at its forward end carries a lever 62, see Figs. 4 and 7. The lever 62 is pivoted upon the shaft 61 in such manner that it may be oscillated in a horizontal plane. The lever can also be oscillated in a vertical plane. The oscillation of the lever in a vertical plane is utilized for operating the clutch members associated with the feed screw and the oscillation thereof in a horizontal plane is utilized for controlling the normal feed of the carriage by means of the feed shaft 24. A pin 63 is carried by the lever 62 and has a head 64 formed thereon that may lodge in a recess 65 formed in the forward face of the carriage. The recess 65 is so positioned that it is in longitudinal alignment with the head of the pin 63 when the lever is in its neutral position. When the lever, see Fig. 10, is moved in a counter-clockwise direction the head 64 enters the recess 65 and thereby precludes oscillation of the lever for moving the shaft 61. In order to actuate the shaft 61 it is necessary that the lever 62 be returned to its normal or neutral position. The forward face 66 of the carriage serves as an abutment means that precludes movement of the lever in a counter-clockwise direction after the shaft 61 has been actuated so as to render the rapid traverse feed means operative.

The lever 62 is provided with a globular head 67 that is received in a socket 68 formed at the upper end of a reciprocating shaft 69. The shaft 69 is also mounted for oscillation. The oscillatory motion of shaft 69 is utilized for rendering the feed shaft 24 operative and inoperative upon the carriage. The reciprocation of shaft 69 has no effect for transmitting motion from feed shaft 24 to the carriage. By reference to Figs. 7 and 9 it will be observed that the shaft 69 is splined in the sleeve 70 carried by the housing 71 mounted upon the apron 72 of the carriage. The sleeve 70 has a gear segment of elongated teeth formed upon it at 73. The teeth formed on the sleeve 70 engage the rack segment 74 formed on the sleeve 75 carried by a tube shaft 76. The tube shaft contains within it a shaft 77. A clutch member 78 is carried by one end of the tube shaft 76 and is adapted to engage its clutch member 79 mounted on the shaft 77 and associated with the bevel gear 80. The bevel gear 80 may be brought into selective engagement with bevel gears 81 and 82 carried by sleeve 83 reciprocally splined upon the feed shaft 24. A suitable clutch spool 84 and hand lever 85 control reciprocation of the sleeve 83 and consequent transmission of power from feed shaft 24 through the bevel gears to a gear 86 formed on the tube shaft 76. The gear 86 meshes with a gear 87, mounted on shaft 88. Shaft 88 carries a gear 89 that meshes with gear 90 or shaft 91. The gear 90 meshes with gear 92 carried by shaft 93. The gear 92 meshes with rack 94 carried by the lathe bed.

A bar 95 is mounted upon the forward face of the lathe bed and is provided with a groove 96. The bar and groove structure provides a base or foundation for tripping dogs 97, 98 and 99 for automatically controlling the rapid traverse and the normal feed of the carriage. The dog 97 is provided with a tapered extension 100, the faces 101 and 102 of which may be engaged by a roller 103 carried by an arm 104 extending from the sleeve 70. Engagement of the roller 103 upon the extension 100 of the dog 97 serves to return the lever 62 to its neutral position. The reciprocating shaft 69 is slotted adjacent its lower end as shown in dotted lines in Fig. 7. This slotted portion of the shaft is exposed to the dogs 98 and 99. The opposed walls of the slot formed in the shaft converge whereby inclined faces 105, 106, 107 and 108 are formed. The inclined faces are adapted to engage upon the dogs 98 and 99 and to thereby actuate the shaft 69 longitudinally through the sleeve 70 for returning the lever 62 to its neutral position. The operation of my device is as follows:

Normally the lever 62 is in the position shown in Figs. 1, 7 and 10. At this time the lever is in its neutral position and the carriage is stationary. Upon moving the lever so as to rotatably actuate the transversely extending shaft 61, the clutch member 50 is actuated as previously explained for rendering the rapid traverse feed operative for moving the carriage. During such operation of the rapid traverse carriage moving means the head 64 of the pin 63 associated with the hand lever 62 precludes movement of the lever 62 so as to rotatably actuate the shaft 69, thereby precluding an operator from bringing the normal cutting carriage feed into operation. After the carriage has been moved to approximately its desired position, the operator would disconnect the rapid traverse means and would then feed the carriage into the work by means of the hand wheel 109 that operates through gear 110 upon the rack 94. Thereupon the operator would actuate the lever 62 for rotatably actuating the reciprocating shaft 69. This action would lodge the head of the pin 63 in the recess 65 and would bring the clutch members 78 and 79 into engagement. The operator would then actuate the hand lever 62 for effecting transmission of power in the desired direction to the bevel gear 80 and through the train of gears associated with and between the gear 86 and the rack 94. The trip dogs 98 and 99 being employed to control the rapid traverse movement of the carriage and the trip dog 97 is used to control the normal feed movement of the carriage. When the lever 62 is oscillated in a vertical plane, the reciprocating shaft is moved vertically of the lathe, thereby bringing either of the faces 105, 106, 107 or 108 in alignment with the dogs 98 or 99. These faces, upon contacting one of the dogs, shift the vertical shaft thereby returning the lever 62 to its normal position and stopping the rapid traverse movement of the carriage. When the lever 62 is actuated in a horizontal plane, the roller 103 is moved toward the bar 95 into the path of the trip dog 97. Movement of the carriage brings the roller in contact with one of the faces 101 or 102 of the dog 97 whereupon the roller is moved away from the bar 95, returning lever 62, through the reciprocating shaft and sleeve, to its normal or neutral position.

What I claim is:

1. In a lathe the combination of a bed, a carriage reciprocally mounted upon the bed, a feed shaft carried by the bed, a feed screw carried by the bed, the feed screw being provided with right and left hand threads, means for transmitting motion from the feed shaft to the carriage and from the feed screw threads to the carriage whereby the screw may actuate the carriage in opposite directions, and a single means for normally rendering the feed shaft and feed screw inoperative upon the carriage and for selective connection of the carriage with the feed shaft and the feed screw.

2. In a lathe the combination of a bed, a carriage reciprocally mounted upon the bed, a feed shaft carried by the bed, a feed screw carried by the bed, the feed screw being provided with right and left hand threads, means for transmitting motion from the feed shaft to the carriage and from the feed screw threads to the carriage whereby the screw may actuate the carriage in opposite directions, and a single lever for normally rendering the feed shaft and feed screw inoperative upon the carriage and for selectively connecting the carriage with the feed shaft and the feed screw threads.

3. In a lathe the combination of a bed, a carriage reciprocally mounted upon the bed, a feed shaft carried by the bed, a feed screw carried by the bed, the feed screw being provided with right and left hand threads, means for transmitting motion from the feed shaft to the carriage and from the feed screw threads to the carriage whereby the screw may actuate the carriage in the opposite direction, a single means for normally rendering the feed shaft and feed screw inoperative upon the carriage and for selective connection of the carriage with the feed shaft and the feed screw threads, and means for precluding operation of the carriage from either of said feed means while the other thereof is operative upon the carriage.

4. In a lathe the combination of a bed, a carriage reciprocally mounted upon the bed, a feed shaft carried by the bed, a feed screw carried by the bed, the feed screw being provided with right and left hand threads, means for transmitting motion from the feed shaft to the carriage and from the feed screw threads to the carriage whereby the screw may actuate the carriage in the opposite direction, a single lever for normally rendering the feed shaft and feed screw inoperative upon the carriage and for selectively connecting the carriage with the feed shaft and the feed screw threads, and means for precluding operation of the carriage from either of said feed means while the other thereof is operative upon the carriage.

5. In a lathe the combination of a bed, a carriage reciprocally mounted on the bed, a feed screw and a feed shaft carried by the bed, a shaft mounted on the carriage, power transmission means between the carriage and the feed shaft including a clutch, power transmission means between the carriage and the feed screw including a clutch, and a single means connected with the shaft mounted on the carriage for normally rendering the feed shaft and feed screw inoperative upon the carriage and for selectively actuating the clutches for rendering the said power transmitting means operative and inoperative upon the carriage.

6. In a lathe the combination of a bed, a carriage reciprocally mounted on the bed, a feed screw and a feed shaft carried by the bed, a shaft mounted on the carriage, power transmission means between the carriage and the feed shaft including a clutch, power transmission means between the carriage and the feed screw including a clutch, a single means connected with the shaft mounted on the carriage for normally rendering the feed shaft and feed screw inoperative upon the carriage and for selectively actuating the clutches for rendering the said power transmitting means operative and inoperative upon the carriage, and means for precluding operation of more than one power transmission means upon the carriage at any one time.

7. In a lathe the combination of a bed, a carriage reciprocally mounted on the bed, a feed screw mounted on the bed and having a right and left-hand thread, a feed shaft mounted on the front end of the bed, a pair of bearings associated with the feed screw, one bearing engaging in the right hand thread and the other bearing engaging in the left hand thread in the feed screw, clutch members associated with each bearing, another clutch member for selective engagement with the clutch members associated with the bearings, a connection between the third mentioned clutch member and the carriage whereby the bearings, clutch members and carriage may be moved in unison by the feed screw, gearing including a clutch associated with the feed shaft and the carriage whereby the carriage may be actuated from the feed shaft, and a lever for selectively actuating the clutches for selectively actuating the carriage from the feed shaft and the feed screw.

8. In a lathe the combination of a bed, a carriage reciprocally mounted on the bed, a feed screw mounted on the bed and having a right and left hand thread, a feed shaft mounted on the front end of the bed, a pair of bearings associated with the feed screw, one bearing engaging in the right hand thread and the other bearing engaging in the left hand thread in the feed screw, clutch members associated with each bearing, another clutch member for selective engagement with the clutch members associated with the bearings, a connection between the third mentioned clutch member and the carriage whereby the bearings, clutch members and carriage may be moved in unison by the feed screw, gearing including a clutch associated with the feed shaft and the carriage whereby the carriage may be actuated from the feed shaft, a lever for selectively actuating the clutches for selectively actuating the carriage from the feed shaft and the feed screw, and interlocking means for precluding transmission of power through any one clutch for operation while another clutch is operative for transmission of power to the carriage.

9. In a lathe the combination of a bed, a carriage reciprocally mounted on the bed, a feed screw mounted on the bed and having a right and left hand thread, a feed shaft mounted on the front end of the bed, a pair of bearings associated with the feed screw, one bearing engaging in the right hand thread and the other bearing engaging in the left hand thread in the feed screw, clutch members associated with each bearing, another clutch member for selective engagement with the clutch members associated with the bearings, a connection between the third mentioned clutch member and the carriage whereby the bearings, clutch members and carriage may be moved in unison by the feed screw, gearing including a clutch associated with the feed shaft and the carriage whereby the carriage may be actuated from the feed shaft, and a single lever for selectively actuating the clutches for selectively actuating the carriage from the feed shaft and the feed screw.

In testimony whereof, I have hereunto subscribed my name this 5th day of September, 1924.

WILLIAM F. GROENE.